A

United States Patent
Zweig

(10) Patent No.: US 7,308,279 B1
(45) Date of Patent: Dec. 11, 2007

(54) DYNAMIC POWER LEVEL CONTROL ON TRANSMITTED MESSAGES IN A WIRELESS LAN

(75) Inventor: Jonathan M. Zweig, Cupertino, CA (US)

(73) Assignee: Nortel Networks Limited, St. Laurent (CA)

( * ) Notice: Subject to any disclaimer, the term of this patent is extended or adjusted under 35 U.S.C. 154(b) by 1264 days.

(21) Appl. No.: 09/753,228

(22) Filed: Dec. 28, 2000

Related U.S. Application Data

(60) Provisional application No. 60/226,342, filed on Aug. 18, 2000.

(51) Int. Cl.
*H04Q 7/20* (2006.01)

(52) U.S. Cl. .................. 455/522; 455/69; 455/115.3

(58) Field of Classification Search .............. 455/69, 455/522, 513, 67.1, 67.11, 13.4, 226.4, 2, 455/226.1; 370/342, 320, 335, 318
See application file for complete search history.

(56) References Cited

U.S. PATENT DOCUMENTS

| | | | |
|---|---|---|---|
| 5,239,584 A | 8/1993 | Hershey et al. ............... 380/28 |
| 5,440,545 A | 8/1995 | Buchholz et al. ............. 370/60 |
| 5,444,781 A | 8/1995 | Lynn et al. ................... 380/46 |
| 5,454,026 A | 9/1995 | Tanaka | |
| 5,465,399 A * | 11/1995 | Oberholtzer et al. .......... 455/69 |
| 5,481,535 A | 1/1996 | Hershey | |
| 5,483,676 A | 1/1996 | Mahany et al. | |
| 5,548,821 A | 8/1996 | Coveley | |
| 5,570,343 A * | 10/1996 | Bishop et al. ............... 370/216 |
| 5,621,894 A | 4/1997 | Menezes | |
| 5,673,319 A | 9/1997 | Bellare et al. .............. 713/181 |
| 5,710,885 A | 1/1998 | Bondi | |
| 5,715,164 A | 2/1998 | Liechti et al. .............. 705/410 |

(Continued)

FOREIGN PATENT DOCUMENTS

EP 0 862 143 A2 9/1998

(Continued)

OTHER PUBLICATIONS

Chi-Chun Lo, et al. "QoS provisioning in handoff algorithms for wireless LAN", International Zurich Seminar on Broadband Communications. Accessing, Transmission, Networking, Feb. 17, 1998, pp. 9-16, XP002151137.

(Continued)

*Primary Examiner*—Thanh Le
*Assistant Examiner*—Tu X. Nguyen
(74) *Attorney, Agent, or Firm*—Blakely Sokoloff Taylor & Zafman, LLP

(57) ABSTRACT

Briefly, in one embodiment, a method for enhancing aggregate data throughput for a number of wireless devices. First, a signal having a first level of effective isotropic radiated power is transmitted by a first wireless electronic device. In the event that a response to the signal is received by the first wireless electronic device, the level of effective isotropic radiated power is reduced to a second level of effective isotropic radiated power. In another embodiment, the aggregate amount of data throughput may be enhanced by monitoring a level of effective isotropic radiated power associated with at least one beacon produced by the first wireless electronic device on a first communication channel. The level of effective isotropic radiated power of the beacon is then reduced if the monitored level is greater than a predetermined power level threshold.

15 Claims, 4 Drawing Sheets

U.S. PATENT DOCUMENTS

| | | | |
|---|---|---|---|
| 5,724,346 A | 3/1998 | Kobayashi et al. | 370/329 |
| 5,745,699 A | 4/1998 | Lynn et al. | 395/200 |
| 5,754,947 A | 5/1998 | Tanabe et al. | |
| 5,838,770 A | 11/1998 | Fukushima et al. | |
| 5,844,905 A | 12/1998 | McKay et al. | |
| 5,852,778 A * | 12/1998 | Labedz | 455/423 |
| 5,881,055 A | 3/1999 | Kondo | |
| 5,881,104 A | 3/1999 | Akahane | |
| 5,889,772 A | 3/1999 | Fischer et al. | 370/346 |
| 5,901,362 A | 5/1999 | Cheung et al. | 455/525 |
| 5,953,426 A | 9/1999 | Windel et al. | 380/51 |
| 5,987,011 A | 11/1999 | Toh | |
| 5,987,062 A | 11/1999 | Engwer et al. | |
| 5,991,287 A | 11/1999 | Diepstraten et al. | |
| 6,002,932 A | 12/1999 | Kingdon et al. | 455/433 |
| 6,031,528 A | 2/2000 | Langfahl, Jr. | |
| 6,055,316 A | 4/2000 | Perman et al. | |
| 6,058,106 A | 5/2000 | Cudak et al. | 370/313 |
| 6,064,678 A | 5/2000 | Sindhushayana et al. | 370/470 |
| 6,067,297 A | 5/2000 | Beach | |
| 6,072,836 A | 6/2000 | Hardiman | |
| 6,115,390 A | 9/2000 | Chuah | |
| 6,115,610 A | 9/2000 | Goetz et al. | |
| 6,154,461 A | 11/2000 | Stuniolo et al. | 370/401 |
| 6,163,810 A | 12/2000 | Bhagavath et al. | |
| 6,173,411 B1 | 1/2001 | Hirst et al. | |
| 6,175,856 B1 | 1/2001 | Riddle | |
| 6,178,327 B1 | 1/2001 | Gomez | |
| 6,182,043 B1 | 1/2001 | Boldl | |
| 6,189,039 B1 | 2/2001 | Harvey et al. | |
| 6,192,230 B1 | 2/2001 | van Bokhorst et al. | |
| 6,215,876 B1 | 4/2001 | Gilley | 380/260 |
| 6,256,334 B1 | 7/2001 | Adachi | 375/132 |
| 6,259,701 B1 | 7/2001 | Shur et al. | |
| 6,304,760 B1 * | 10/2001 | Thomson et al. | 455/503 |
| 6,330,231 B1 | 12/2001 | Bi | |
| 6,331,983 B1 | 12/2001 | Haggerty et al. | |
| 6,370,381 B1 | 4/2002 | Minnick et al. | 455/445 |
| 6,392,990 B1 | 5/2002 | Tosey et al. | |
| 6,404,756 B1 | 6/2002 | Whitehill et al. | |
| 6,434,134 B1 | 8/2002 | La Porta et al. | 370/338 |
| 6,438,108 B1 | 8/2002 | Kanljung et al. | |
| 6,438,365 B1 * | 8/2002 | Balteanu | 455/326 |
| 6,456,597 B1 | 9/2002 | Bare | |
| 6,456,860 B1 | 9/2002 | Nakagaki | 455/561 |
| 6,463,295 B1 * | 10/2002 | Yun | 455/522 |
| 6,469,991 B1 | 10/2002 | Chuah | |
| 6,487,406 B1 | 11/2002 | Chang et al. | 455/426 |
| 6,522,888 B1 * | 2/2003 | Garceran et al. | 455/456.3 |
| 6,535,493 B1 | 3/2003 | Lee et al. | 370/329 |
| 6,538,764 B2 | 3/2003 | Ueda | |
| 6,553,015 B1 | 4/2003 | Sato | 370/331 |
| 6,577,609 B2 | 6/2003 | Sharony | 370/312 |
| 6,577,613 B1 | 6/2003 | Ramanathan | |
| 6,580,700 B1 | 6/2003 | Pinard et al. | 370/332 |
| 6,614,937 B1 | 9/2003 | Hwang | |
| 6,640,325 B1 | 10/2003 | Fischer | |
| 6,643,469 B1 | 11/2003 | Gfeller et al. | |
| 6,657,954 B1 | 12/2003 | Bird et al. | |
| 6,671,266 B1 * | 12/2003 | Moon et al. | 370/342 |
| 6,687,247 B1 | 2/2004 | Wilford et al. | |
| 6,690,659 B1 | 2/2004 | Ahmed et al. | 370/328 |
| 6,697,336 B1 | 2/2004 | Socher | |
| 6,697,378 B1 | 2/2004 | Patel | 370/468 |
| 6,701,361 B1 | 3/2004 | Meier | 709/224 |
| 6,714,514 B1 | 3/2004 | Espax et al. | 370/230 |
| 6,721,032 B2 | 4/2004 | Hasegawa et al. | |
| 6,745,013 B1 * | 6/2004 | Porter et al. | 455/69 |
| 6,795,407 B2 | 9/2004 | Chesson | |
| 6,807,146 B1 | 10/2004 | McFarland | |
| 6,842,605 B1 * | 1/2005 | Lappetelainen et al. | 455/13.4 |
| 6,873,627 B1 | 3/2005 | Miller et al. | |
| 6,891,855 B2 | 5/2005 | Bruckman | |
| 6,947,483 B2 | 9/2005 | Engwer | |
| 6,956,867 B1 | 10/2005 | Suga | |
| 2001/0048744 A1 | 12/2001 | Kimura | |
| 2002/0009199 A1 | 1/2002 | Ala-Laurila et al. | 380/247 |
| 2002/0037014 A1 | 3/2002 | Myojo et al. | |
| 2002/0045428 A1 | 4/2002 | Chesson | |

OTHER PUBLICATIONS

"IEEE standard for information technology-telecommunications and information exchange between systems-local and metropolitan area networks-specific requirement. Part 11: wireless LAN medium access control (MAC) and physical layer (PHY) specification. (ISO/IEC 8802-11, ANSI/IEEE Std 802.11-1999)" Aug. 20, 1999, pp. 38-54, XP002206839.

U.S. Appl. No. 09/751,332, filed Dec. 28, 2000, Engwer, Darwin A., et al.

Khayata, R. Ellen , et al., "A Distributed Medium Access Protocol for Wireless LANs", *IEEE Transactions on Communications*, (1995),238-242.

Koutroubinas, Stelios , et al., "A New Efficient Access Protocol for Integrating Multimedia Services in the Home Environment", *IEEE Transactions on Consumer Electronics*, vol. 45, Issue 3, (Aug. 1999),481-487.

* cited by examiner

DYNAMIC POWER LEVEL CONTROL ON TRANSMITTED MESSAGES IN A WIRELESS LAN

This application claims benefit of U.S. Provisional Application No. 60/226,342 filed Aug. 18, 2000.

FIELD OF THE INVENTION

The present invention relates to the field of networking. In particular, this invention relates to a technique for minimizing signal interference within a wireless local area network through power level control.

BACKGROUND OF THE INVENTION

The ability of users to access programs and share data over local area networks (referred to as "LANs") has become a necessity for most working environments. To improve efficiency and ease of use, certain enhancements may be added to a LAN such as remote wireless access. By providing wireless access, a wireless LAN (WLAN) is formed.

As described in U.S. Pat. No. 5,987,062 issued to Netwave Technologies, Inc., now owned by Nortel Networks Limited, one type of WLAN employs dedicated stations, which are referred to as access points (APs). Therein, each AP is a relay station that includes a radio frequency (RF) transceiver that receives (and transmits) radio data packets over a communication channel from (and to) mobile units within a predetermined, non-adjustable coverage distance. The level of effective isotropic radiated power used by the RF transceiver determines the coverage distance. An example of this AP is a BAYSTACK™ 650 Wireless Access Point produced by Nortel Networks Limited.

Hence, depending on the coverage distance, an AP can share its communication channel with tens or even hundreds of mobile units. This reduces the aggregate amount of data throughput to the mobile units. To improve data throughput, one proposed solution is to implement additional APs within the WLAN. However, this proposed solution may not be applicable, depending on the operating environment.

For example, in order to effectively reuse communication channel frequencies within a WLAN, each additional AP must be placed outside a pollution range associated with its neighboring AP. This "pollution range" is the coverage area determined by both the coverage distance of the AP as well as the coverage distance of any of its mobile units because they communicate on the same communication channel. For a worst case scenario, where the level of effective isotropic radiated power used by the mobile unit is equivalent to the level of effective isotropic radiated power used by the AP, the pollution range is twice the coverage distance, and thus, a maximum of four times the coverage area of the AP. Hence, the additional placement of APs may not be a legitimate solution to data rate throughput problems for a WLAN when there is a high concentration of mobile units within a small area.

SUMMARY OF THE INVENTION

The invention relates to adjustments in the level of effective isotropic radiated power of one or more wireless devices within a wireless network system, such as an access point (AP) and/or a wireless unit (WU) for example. A reduction in the power level reduces the coverage range of a radiated signal. By adjusting the power level, in certain situations, greater aggregate data throughput can be realized by the wireless devices.

Other aspects and features of the present invention will become apparent to those ordinarily skilled in the art upon review of the following description of specific embodiments of the invention in conjunction with the accompanying claims and figures.

BRIEF DESCRIPTION OF THE DRAWINGS

The features and advantages of the present invention will become apparent from the following detailed description of the present invention in which.

DETAILED DESCRIPTION OF THE INVENTION

Herein, the exemplary embodiments of the present invention relate to a technique for minimizing signal interference within a wireless local area network (WLAN), such as by power level control for example. The WLAN may be configured in accordance with Institute of Electrical and Electronics Engineers (IEEE) 802.11 standard. These embodiments are not exclusive; rather, they merely provide a thorough understanding of the present invention. Well-known circuits are not set forth in detail in order to avoid unnecessarily obscuring the present invention.

In the following description, certain terminology is used to describe features of the present invention. For example, "logic" includes hardware and/or software module(s) that perform a certain function on incoming information. A "software module" is executable code such as an operating system, an application or an applet for example. This module may be stored in a storage medium such as a hard disk, memory (non-volatile and/or volatile), CD-ROM, tape, etc. The term "information" is defined as data, address, and/or control. For transmission, the information may be placed in a frame featuring a single data packet or a series of data packets.

In addition, a "link" is broadly defined as one or more information-carrying mediums to establish a communication pathway. Examples of the medium include a physical medium (e.g., electrical wire, optical fiber, cable, bus traces, etc.) or a wireless medium (e.g., air in combination with wireless signaling technology).

Figure 1:
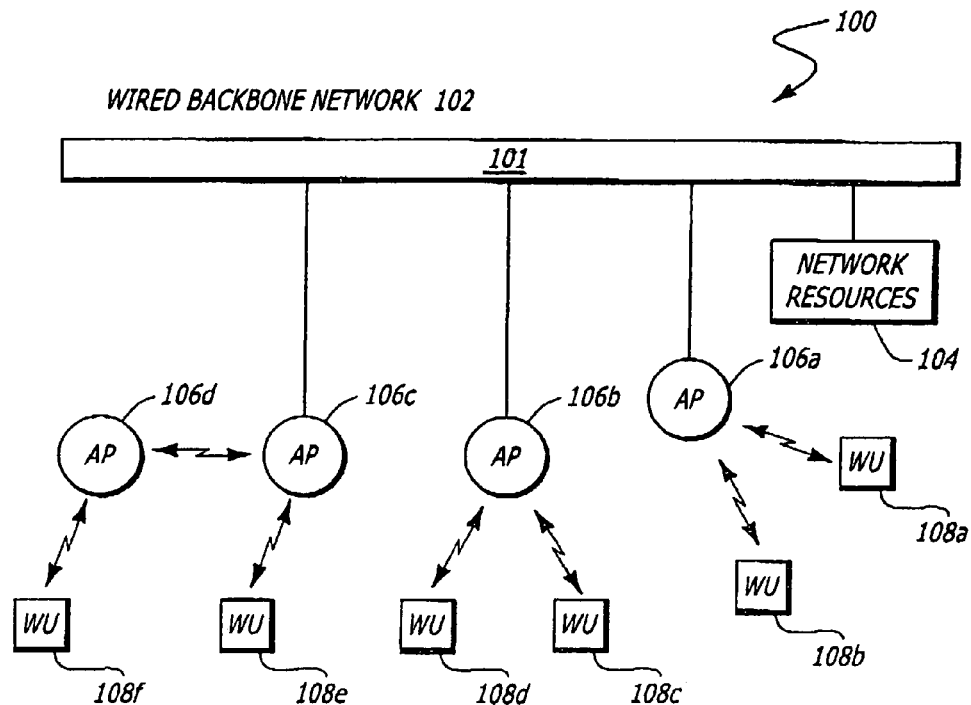
FIG. 1 is a first exemplary embodiment of a wireless network system.

Referring to FIG. 1, a first exemplary embodiment of a wireless network system 100 in accordance with the invention is illustrated. The wireless network system 100 comprises a link 101 based on a physical medium. Herein, the link 101 is part of a wired backbone network 102 that includes network resources 104 available for users of the system 100. The wireless network system 100 further includes one or more access points (APs) 106a-106d that communicate via a wireless link with one or more wireless units (WUs) 108a-108f. For this embodiment, four (4) APs 106a-106d communicate with six (6) WUs 108a-108f.

Users using the WUs 108a-108f can access the network resources 104 via any of the APs 106a-106d, which are generally transparent bridges that link a wireless network defined by one or more WUs 108a-108f with the wired backbone network 102. The WUs 108a-108f communicate with the APs 106a-106d typically using a standardized protocol, such as the IEEE 802.11 protocol.

A "wireless unit" (WU) is defined herein as any electronic device comprising processing logic (e.g., a processor, microcontroller, state machine, etc.) and a wireless transceiver for receiving/transmitting information from/to an access point (AP) or another wireless unit (WU). Examples of a WU include a computer (e.g., desktop computer, laptop computer, hand-held computer such as a personal digital assistant "PDA", etc.), communications equipment (e.g., pager, telephone, facsimile machine, etc.), a television set-top box, or appliances such as refrigerator pads, electronic picture frames, alarm detectors, water detectors, and the like. As an option, a WU is loaded with logic to reduce the level of effective isotropic radiated power (hereinafter referred to as "power level") utilized by its wireless transceiver as described below.

An "access point" (AP) is a device that provides a bi-directional connection between one or more WUs and a network such as the wired backbone network 102. However, an AP could also have a wireless connection back to the backbone network 102, such as AP 106d, which has a wireless link to the backbone network 102 via another AP 106c. The wired backbone network can be of any type, including an Ethernet, a token ring, and an asynchronous transfer mode (ATM) network.

Figure 2:
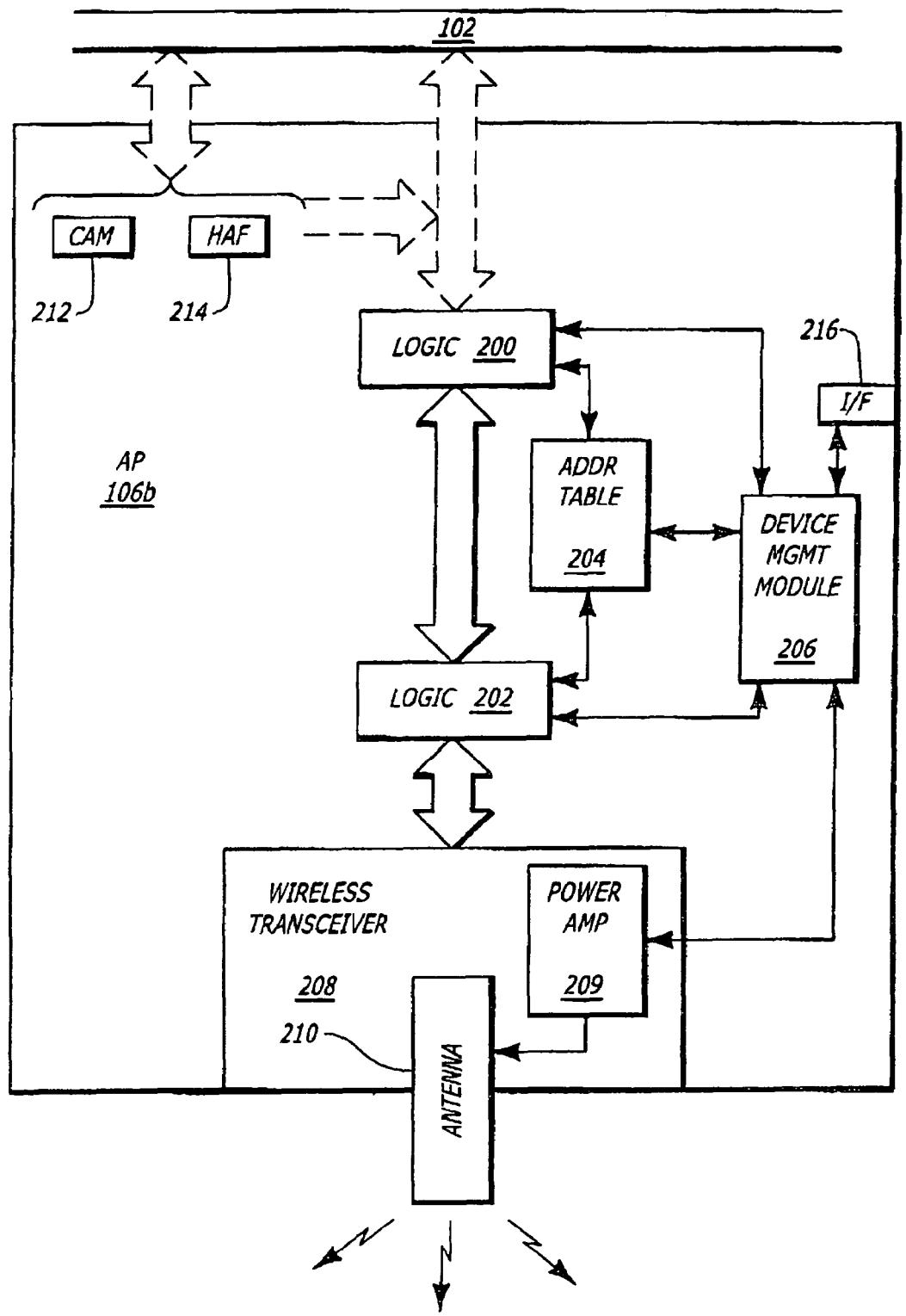
FIG. 2 is an exemplary embodiment of an access point (AP) employed in a wireless network system.

Referring now to FIG. 2, an exemplary embodiment of an access point (AP) is shown. For illustrative purposes, the access point is represented by AP 106b and differs in function from the access points described in U.S. Pat. No. 5,987,062. As shown, AP 106b comprises logic 200 and 202, an address table 204, a device management logic 206, and a wireless transceiver 208 including a power amplifier 209 and an antenna 210.

In particular, the logic 200 is used to determine whether certain information from the wired backbone network 102 is destined for one or more of the WUs. The address table 204 includes Medium Access Control (MAC) addresses for all of the wireless units associated with the AP 106b such as WUs 108c and 108d of FIG. 1. In the special case of all broadcast or some multicast packets, the packets are addressed to all or some of the wireless units (WUs) associated with the access point (AP) on a "best effort" basis.

Similarly, as information from the wireless units (WU) is received by the wireless transceiver 208, the logic 202 monitors addresses within this information against the contents of the address table 204. One reason is that only information from authenticated and associated wireless units (e.g., WUs 108c and 108d) is accepted. Hence, if a non-authenticated wireless unit transmits packets, these packets will not be forwarded to the wired backbone network 102 of FIG. 1. The logic 202 subsequently transmits the information to the logic 200 for routing to the wired backbone network 102.

In the event that the fixed backbone network 102 of FIG. 1 has a substantially larger data rate than the wireless network, content addressable memory (CAM) 212 and a hardware address filter (HAF) 214 may be employed within the AP 106b. The CAM 212 and HAF 214 are in communication with the fixed backbone network 102 and collectively filter information at the hardware level so that the logic 200 processes only that portion of the information routed over the wired backbone network 102 is addressed to associated WUs.

The device management logic 206 provides a mechanism for adjusting the various parameters and controlling the functionality of the AP 106b. For example, the device management logic 206 is responsible for adjusting the level of effective isotropic radiated power through adjusting current levels to the power amplifier 209. This reduces or increases the coverage area for the antenna 210. The adjustment in the power level may be (i) in small incremental changes (e.g., one milliwatt "mW" at a time), (ii) in accordance with preset levels and the like. For example, a first preset (low) level may set the power amplifier 209 to provide 5 mW while a second (medium) and third (high) level may set the power amplifier to provide 25 mW and 100 mW, respectively.

It is contemplated that a user can manually adjust the power levels via a port interface 216 within the AP 106b. The port interface 216 provides a direct connection to the AP 106b. Other mechanisms include (1) Simple Network Management Protocol (SNMP) management tools such as OPTIVITY® by Nortel Networks Limited of Montreal, Canada, (2) TELNET, or (3) web-based management software.

Referring back to FIG. 1, in the typical scenario, a WU associates itself with one of the APs to communicate with the wired backbone network 102. For instance, in the example shown in FIG. 1, WUs 108a and 108b are associated with AP 106a, WUs 108c and 108d are associated with AP 106b, WU 108e is associated with AP 106c, and WU 108f is associated with wireless AP 106d. Which access point (AP) a wireless unit (WU) is associated with can depend on many factors, including signal quality, load balancing, restricted links and other factors. The AP that a particular WU is associated with can change, such as when the WU "roams" from the coverage area of a particular AP to a coverage area of another AP. From the standpoint of the user using the WU, this change in associated AP is transparent.

Figure 3:
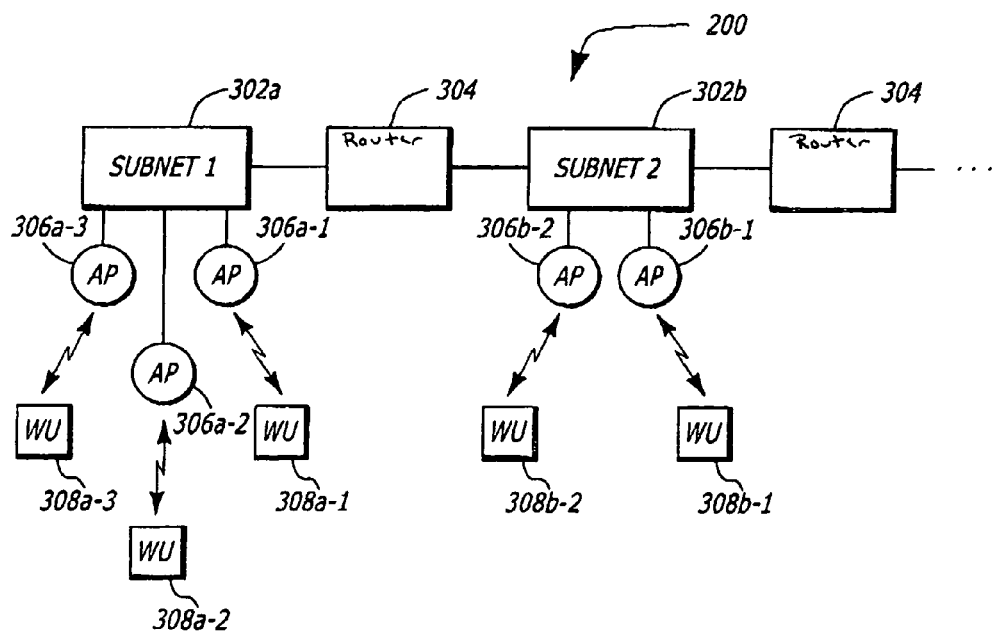
FIG. 3 is a second exemplary embodiment of a wireless network system.

Referring to FIG. 3, a second exemplary embodiment of a wireless network system 300 in accordance with the invention is shown. The wireless network system 300 comprises two or more sub-networks 302a and 302b, which communicate with each other by way of a router 304. The sub-networks 302a and 302b can be any wired backbone network, including Ethernet, token ring, and an asynchronous transfer mode (ATM) network. The sub-networks 302a and 302b need not be of the same type, for instance, sub-network 302a can be an Ethernet, and sub-network 302b can be a token ring. Each sub-network 302a and 302b has one or more APs for communicating with the WU. For instance, sub-network 302a includes APs 306a-1, 306a-2, 306a-3 for communicating respectively with WUs 308a-1, 308a-2, and 308a-3. Sub-network 302b includes APs 306b-1 and 306b-2 for communicating respectively with WUs 308b-1 and 308b-2. In this system, a WU associated with an AP on a particular sub-network (e.g. sub-network 302a) can also change its association to an AP on another sub-network (e.g. sub-network 302b) by roaming as discussed above or other circumstances.

Figure 4:
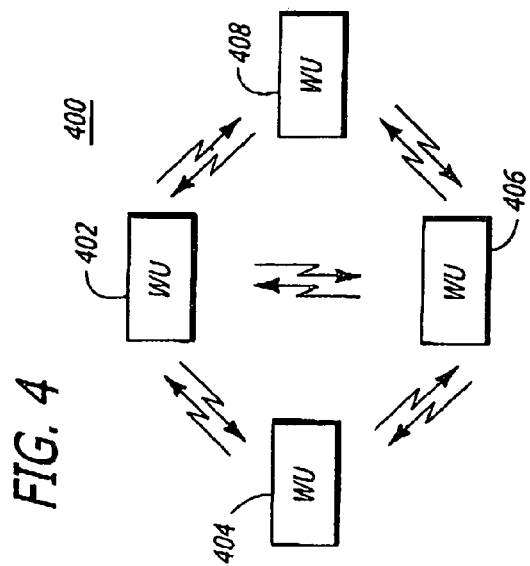
FIG. 4 is a third exemplary embodiment of a wireless network system.

Referring to FIG. 4, an third exemplary embodiment another wireless network system 400 in accordance with the invention is shown. The wireless network system 400 comprises two or more wireless units (WUs) that can communicate with each other via a wireless link. In this example, four WUs 402, 404, 406 and 408 are shown, each of which can communicate with the remaining units via the wireless link. In contrast to the wireless network systems of FIGS. 1 and 3, this wireless network system 400 does not use a wired backbone network or APs. This type of system 400 is known in the relevant art as an "ad hoc" wireless network system.

Figure 5:
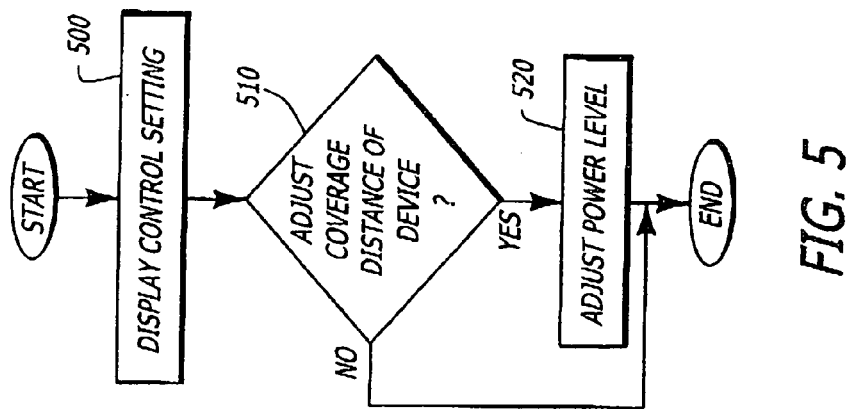
FIG. 5 is a first exemplary embodiment of the protocol to manually adjust the coverage distance of a device employed in one of the wireless networks systems described in FIGS. 2-4.

Referring now to FIG. 5, a first exemplary embodiment of the protocol followed to manually adjust the coverage distance of a device by a site survey is shown. The "device" may include either an AP or a WU. Herein, for this embodiment, the device includes logic to produce a control setting displayed on a monitor integrated with the device or attached thereto (block 500). The control setting may be represented as alphanumeric information or an object. This enables a system administrator and/or a user to adjust the coverage distance for the device through adjustment of the power level via the control settings (blocks 510 and 520). For improved results, any reduction of the power level may be accomplished in accordance with a logarithmic function while any increase in the power level may be accomplished at a constant, incremental change.

Figure 6:
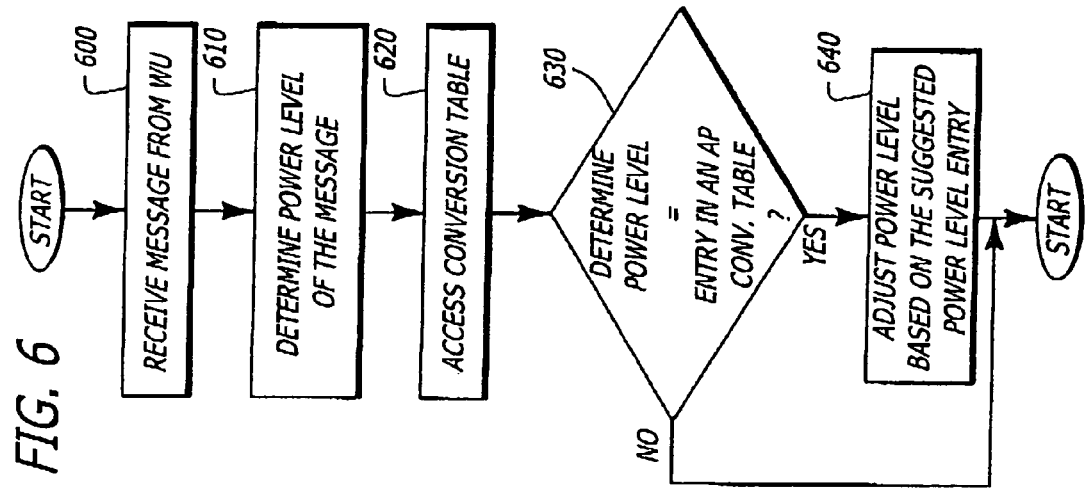
FIG. 6 is a second exemplary embodiment of a protocol to automatically adjust the coverage distance of a device employed in one of the wireless networks systems described in FIGS. 2-4.

Referring now to FIG. 6, a second exemplary embodiment of the protocol followed to automatically adjust the coverage distance during communications between an AP and a wireless unit (WU) is shown. Herein, the AP monitors the signal strength of messages provided by the WU to determine whether the power level of the AP should be reduced for communications with the WU. Such determination may be accomplished through a conversion table. Loaded into persistent storage on the AP, the conversion table includes (1) a plurality of entries associated with determined power levels, and (2) a corresponding plurality of entries associated with suggested power levels. If no change of power level is needed, the suggested power level is set to be equal to its corresponding determined power level.

More specifically, when the AP receives a message from the WU, it determines the power level of the received message and accesses the conversion table (blocks 600, 610 and 620). Upon accessing the conversion table, the AP compares the determined power level to power levels within the first group of entries (block 630). If a match is detected, the power level of the AP used to transmit to that WU is adjusted based on the contents in the suggested power level entry (block 640). Of course, the WU may perform a complimentary adjustment in a similar manner as the AP described above.

Also, both the WU and AP may collectively reduce broadcast coverage by synchronizing their power adjustment operations. For example, when the WU associates with the AP, both the AP and the WU transmit at full power while listening to each other. At that point, mutual power level adjustments by one or both devices may be determined.

Figure 7:
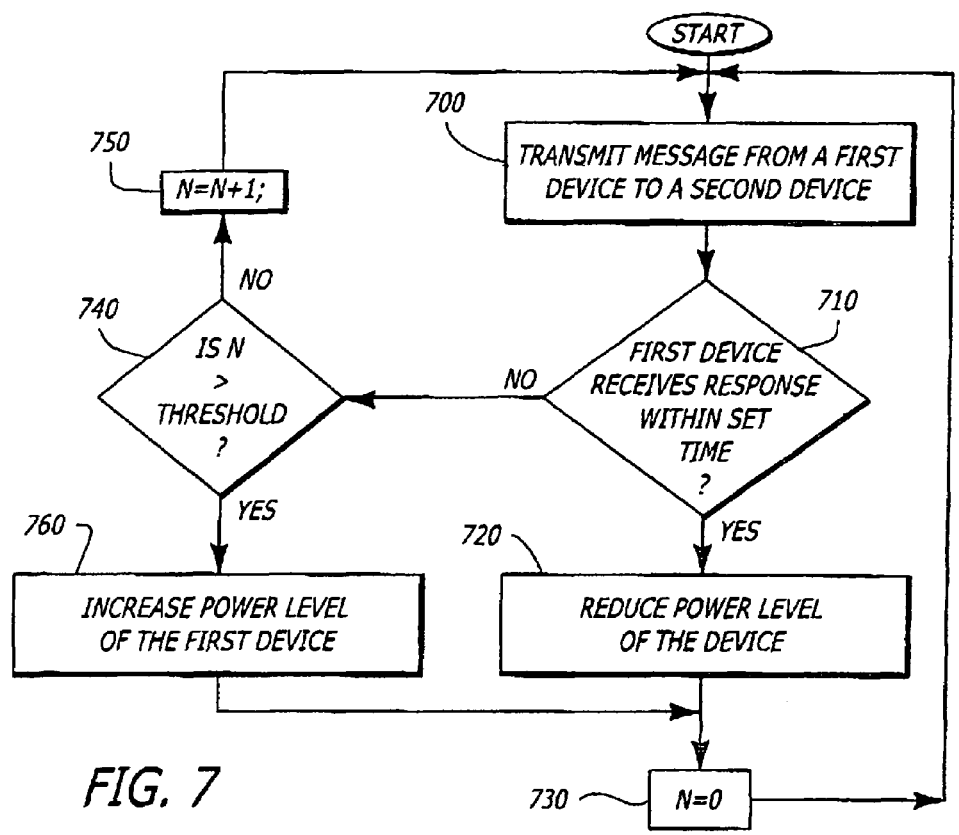
FIG. 7 is a third exemplary embodiment of a protocol to dynamically adjust the coverage distance of a device employed in one of the wireless networks systems described in FIGS. 2-4.

Referring now to FIG. 7, a third exemplary embodiment of the protocol followed to dynamically adjust the coverage distance during communications between multiple devices is shown. The device conducts the dynamic adjustment(s) of coverage distance through periodic reassessment of its power level setting. Herein, the device transmits a message to another device (block 700). If the device receives a response to that message within a certain time period, the device reduces the power level of the wireless transceiver and monitors whether a response is obtained for the next message (block 710 and 720). In addition, the count value (N) of the retry counter may be reset to zero (block 730).

Alternatively, if the device fails to receive a response after a specific number (N) of retries, normally "N" being greater than one, the device increases the power level of the wireless transceiver (blocks 740, 750 and 760). Thereafter, the device continues to monitor for a response to the message. Once the response is received, the power level is maintained for subsequent communications with the wireless unit.

Figure 8:
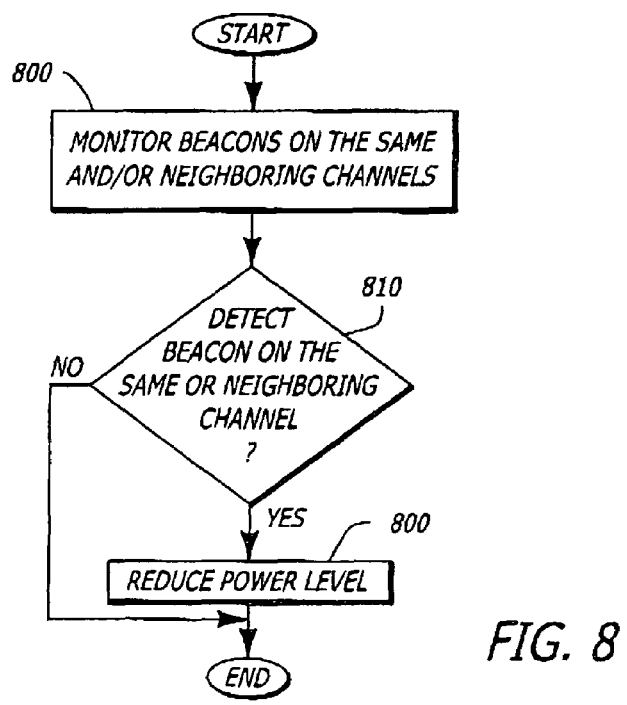
FIG. 8 is a fourth exemplary embodiment of a protocol to adjust the coverage distance of an access point (AP) employed in one of the wireless networks systems described in FIGS. 2-4.

Referring now to FIG. 8, a fourth exemplary embodiment of the protocol followed to adjust the communication range of an AP is shown. Herein, the AP monitors beacons produced by other APs on the same communication channel or an adjacent communication channel (block 800). If the AP detects a beacon with a substantial power level (e.g., greater than a predetermined power level threshold such as 25 mW), it is determined that another AP is in close proximity (block 810). In response, the AP reduces its power level to account for the presence of the other AP (block 820).

Of course, one problem is that once one AP reduces its power, the other AP(s) will not detect the presence of the AP. Thus, the other AP(s) will not reduce their power levels. Thus, it may be necessary to keep track of the maximum power of received beacons from other APs and to periodically send some beacons at full power (or a designated power level). These periodic beacons allow other AP(s) to assess channel conditions.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A method comprising:
   transmitting a signal having a first level of effective isotropic radiated power by a first wireless electronic device;
   reducing a level of effective isotropic radiated power to a second level of effective isotropic radiated power in accordance with a logarithmic function when a response to the signal is received by the first wireless electronic device within a predetermined period of time; and
   increasing the level of effective isotropic radiated power to a third level of effective isotropic radiated power in accordance with a non-logarithmic function.

2. The method of claim 1 further comprising:
   after reducing of the level of effective isotropic radiated power to the second level of effective isotropic radiated power, increasing a level of effective isotropic radiated power to a fourth level of effective isotropic radiated power if no response to the signal is received by the first wireless electronic device within the predetermined period of time.

3. The method of claim 2, wherein the fourth level of effective isotropic radiated power is greater than the second level and less than the first level.

4. The method of claim 1, wherein the first wireless electronic device is an access point.

5. The method of claim 1 further comprising:
increasing a level of effective isotropic radiated power to the third level of effective isotropic radiated power if no response to the signal is received by the first wireless electronic device within the predetermined period of time and after a predetermined number of retries.

6. The method of claim 1, wherein the response to the signal is a beacon from a second wireless electronic device.

7. The method of claim 6, wherein the second wireless electronic device is an access point.

8. The method of claim 1, wherein the response to the signal is a message from a second wireless electronic device.

9. A method comprising:
transmitting a signal having a first level of effective isotropic radiated power by a first wireless electronic device;
reducing a level of effective isotropic radiated power to a second level of effective isotropic radiated power when a response to the signal is received by the first wireless electronic device within a predetermined period of time;
increasing a level of effective isotropic radiated power to a third level of effective isotropic radiated power if no response to the signal is received by the first wireless electronic device within the predetermined period of time, wherein a rate of change from the first level of effective isotropic radiated power to the second level of effective isotropic radiated power is greater than a rate of change from the second level of effective isotropic radiated power to the third level of effective isotropic radiated power.

10. A method comprising:
receiving a signal from a first wireless electronic device;
determining a power level of the signal;
comparing the power level to determined power levels stored within entries of a conversion table, the conversion table including a plurality of entries associated with determined power levels and a plurality of entries associated with suggested power levels, each suggested power level corresponding to one of the determined power levels;
setting the power level of the signal to a first suggested power level of the suggested power levels corresponding to a first determined power level of the determined power levels when the power level matches the first determined power level; and
maintaining the power level of the signal if the power level fails to match any power level of a first group of the predetermined power levels.

11. The method of claim 10, wherein the setting of the power level includes increasing the power level of the signal if the first suggested power level is greater than the first determined power level.

12. The method of claim 10, wherein the setting of the power level includes decreasing the power level of the signal if the first suggested power level is less than the first determined power level.

13. A method comprising:
detecting a beacon from a neighboring access point by access point;
determining a power level of the beacon;
decreasing a power level for transmission of signals from the access point upon detecting that the power level of the beacon is greater than a predetermined power level threshold; and
periodically transmitting beacons from the access point at a designated power level greater than the power level to enable other neighboring access points to assess channel conditions.

14. The method of claim 13 further comprising:
maintaining maximum power levels of received beacons from neighboring access points including the neighboring access point.

15. The method of claim 13, wherein the designated power level is a full power transmission level.

* * * * *